A. C. ROEBUCK.
CONDENSING LENS MOUNT.
APPLICATION FILED DEC. 29, 1917.
1,282,293.
Patented Oct. 22, 1918.
2 SHEETS—SHEET 1.
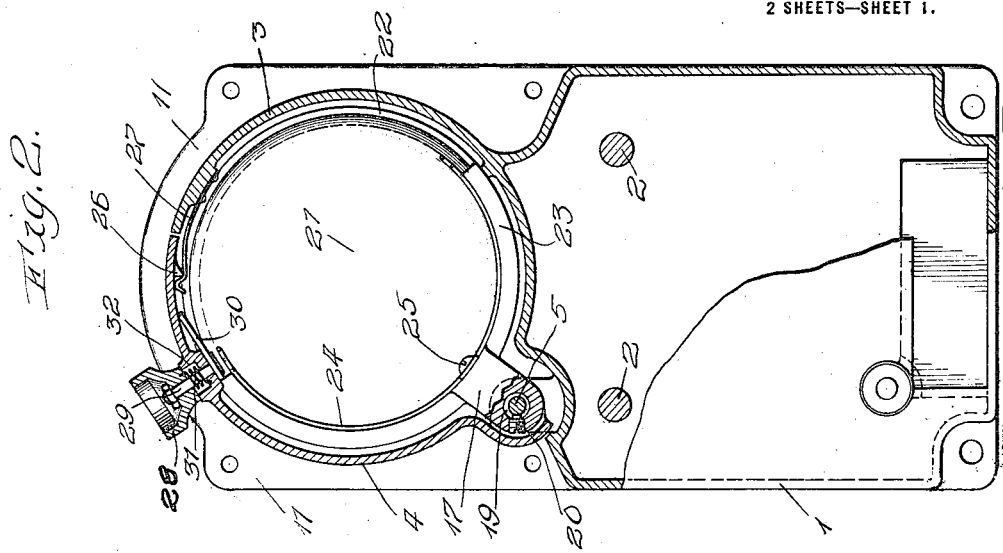
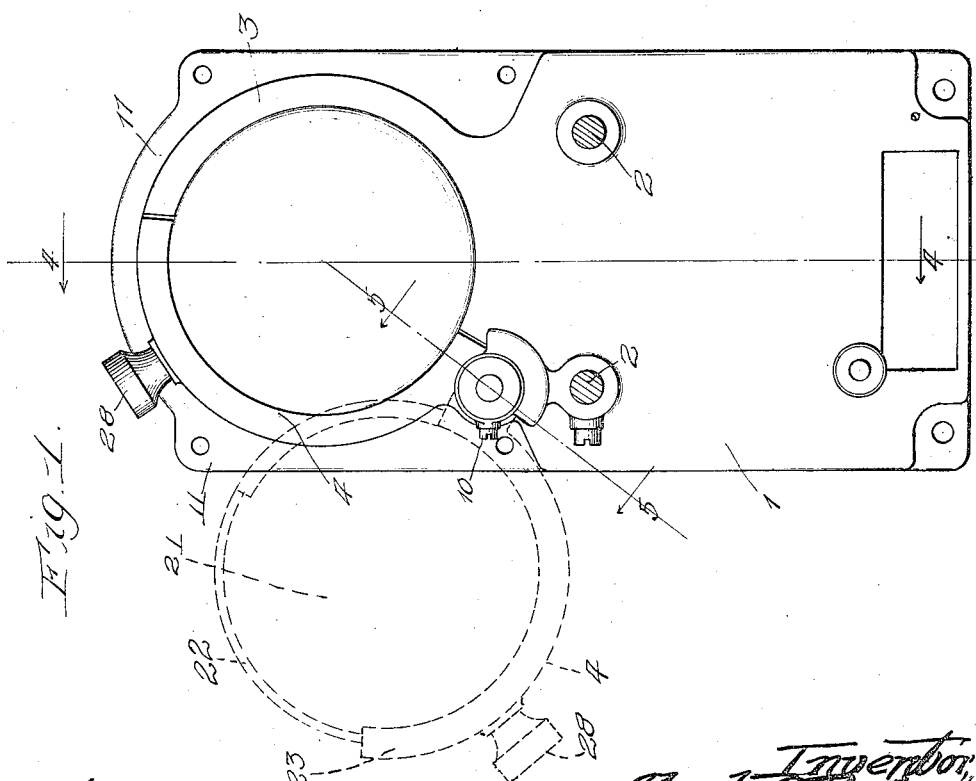

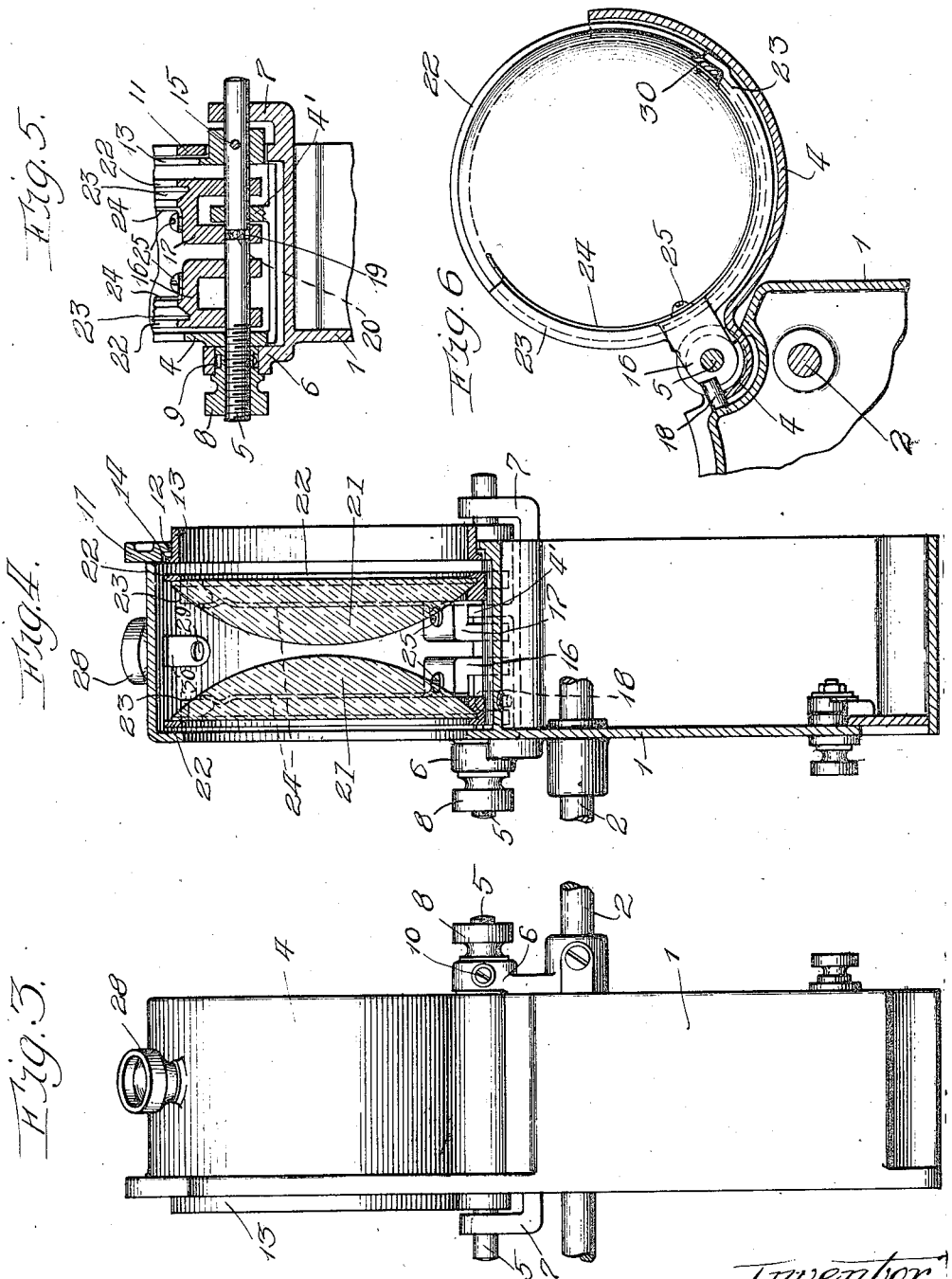

UNITED STATES PATENT OFFICE.

ALVAH C. ROEBUCK, OF CRYSTAL LAKE, ILLINOIS.

CONDENSING-LENS MOUNT.

1,282,293.  Specification of Letters Patent.  Patented Oct. 22, 1918.

Application filed December 29, 1917. Serial No. 209,413.

*To all whom it may concern:*

Be it known that I, ALVAH C. ROEBUCK, a citizen of the United States, residing at Crystal Lake, in the county of McHenry and State of Illinois, have invented certain new and useful Improvements in Condensing-Lens Mounts, of which the following is a specification.

This invention relates to an adjustable holder and housing for condensing lenses used to condense the light rays from an arc lamp or other source of illumination to concentrate the light rays for projection through a small aperture for the illumination of a magic lantern transparency, motion picture film, and the like, the principal object being to provide a focal adjustment for varying the position of one lens with respect to the other.

The invention consists in the novel construction, combination and arrangement of the several parts.

In the accompanying drawings—

Figure 1 is a front elevation of a condenser mount illustrating the invention.

Fig. 2 is a sectional view.

Fig. 3 is a side view.

Fig. 4 is a sectional view taken on line 4—4 of Fig. 1.

Fig. 5 is a sectional view taken on line 5—5 of Fig. 1; and

Fig. 6 is a detail view showing one of the lenses in its rotated position.

In the present exemplification of my invention it is considered desirable to have the front lens in a fixed position, and to adjust the position of the rear lens. This is for the purpose of preventing cold air from getting in around the edges of the front condenser as it would tend to do if the front lens were adjustable.

A main frame or casing 1 is supported in front of the source of illumination (not shown) and is held in position with respect to the machine or apparatus to which it is attached by any suitable means, such as rods 2 which extend through the casing and by set screws in holes as shown in the margin. The upper portion of this casing comprises a housing for containing the lenses consisting of a circular segment 3 and a rotatable circular door 4, which together with the segment 3 forms a closed circular housing. This door 4 is rotatable on a shaft 5 which is mounted in brackets 6 and 7 at the front and rear of the casing. A thumb screw 8 is threaded on the end of the shaft 5 and has a portion with a groove 9 which is insertible within the bracket 6 at the front of the machine, in reality forming the bearing for this end of the shaft. This thumb screw is held in place by a screw 10 inserted through the bracket and engaging in the groove 9 so that the thumb screw 8 will be held fixed in the bracket 6 upon rotation, but will cause the longitudinal movement of the shaft corresponding to the direction in which it is rotated.

At the rear of the housing is a plate 11 preferably formed integral with the housing segment 3 and provided with a perforation 12 in which a collar 13 is slidable, the collar having an outer ridge 14 inside of the plate 11 to limit its outward movement and to assist in making a more nearly air-tight connection with the plate 11. This collar is mounted on the shaft 5 and a pin 15 is inserted through the mounting of the collar and through the shaft, which holds the shaft against rotation, but carries the collar longitudinally with it when the thumb screw 8 is rotated.

Freely mounted on the shaft 5, between the door 4 and the collar 13 are two lens carriers 16 and 17 turned in opposite directions, the front lens carrier 16 being held in place against longitudinal movement by means of a projection 18 which also limits the rotational movement of the door 4, as shown in Fig. 6. The other carrier 17 is connected to the shaft 5 for longitudinal movement therewith by means of a groove 19 in the shaft and an engaging screw 20 inserted through the carrier into the groove. The longitudinal movement of this carrier 17 and the movement of the shaft are limited by a bearing bracket 4' which is positioned between the two bearing mounts of the carrier 17, as shown more clearly in Figs. 4 and 5.

There are two similar condensing lenses 21, one for each of the carriers 16 and 17, and each lens is usually flat or concave on one side and convex on the other. Each carrier is formed with an outer ring 22 which the flat side of one of the lenses abuts with a grooved portion 23 extending only a portion of the circumference, in the groove of which the lens is seated. Each lens is held in place by means of a spring 24 which is secured to the carrier by a screw 25.

On the inside of the edge of the door 4 is an angular projection 26 which is engaged by the bent end of a spring 27 secured to the housing section 3 for holding the door 4 in closed position. A knob 28 is attached to the door 4 by means of a bolt 29 which extends through it and through the door and carries an arm 30 at the inner end thereof which is rotatable in either direction from a central position, as shown by Fig. 4, to engage the end of either of the grooved portions 23 of the front or rear lens carrier. This knob and its arm 30, however, are held normally in a central position by means of a spring 31 seated in a recess 32 in the door surrounding the bolt, and attached at one end to the casing, and at the other end to the knob, as clearly shown in Fig. 2.

In operation the knob or thumb screw 8 is rotated in either direction to vary the adjustment of the rear lens, thereby changing the focal adjustment to suit the desired condition. This adjusting movement also causes the corresponding movement of the collar 13, thereby keeping a uniform opening adjacent the rear lens at all times which protects the edge from exposure to air blasts and reduces the tendency to break. If it becomes necessary to remove or replace either of the lenses the door knob 28 is rotated in either direction from its central position until the arm 30 engages either one of the rotatable carriers 16 or 17, whereupon the opening of the door 4 will cause the corresponding movement of the carrier which will remove the lens from within the housing so that the lens can be easily disengaged from its carrier and from the spring 24 which tends to hold it in place, and a new lens is substituted. Of course the door 4 may be opened without engaging either of the carriers by simply allowing the knob 28 to remain in its central and normal position

I claim:—

1. A condensing lens mount comprising lens carriers, means for holding one carrier against movement along its axis, and mechanical means for moving and adjusting another of the carriers longitudinally of their common axis and with respect to the fixed carrier.

2. A condenser mount comprising two rotatable carriers and a shaft upon which they are rotatable, one of the carriers being fixed to the shaft and movable longitudinally with it with respect to the other carrier.

3. A condenser mount comprising a longitudinal movable shaft, a pair of carriers rotatable upon the shaft, means for connecting one of the carriers to the shaft, and means for fixing the longitudinal position of the other carrier with respect to the shaft.

4. In a condenser mount, a carrier having a circular ring and rotatable about an axis at the periphery thereof, and a grooved container adjacent the ring extending only a portion of the circumference thereof.

5. The combination with a condenser lens having sides of different form, of a carrier therefor having a ring which one side of the lens abuts, a grooved portion adjacent a portion of the ring in which the edge of the lens is seated, and resilient means for holding the lens in the carrier.

6. A condenser mount comprising a shaft threaded on one end, means for preventing the rotation of the shaft, a pair of lens carriers one fixed in position longitudinally of the shaft, means for connecting the other carrier for longitudinal movement with the shaft, and a thumb screw fixed in position but engaging the threaded portion of the shaft for moving it and the carrier with respect to the fixed carrier.

7. A condenser mount comprising a housing with a pivoted door, a pair of lens carriers spaced apart and also pivotally mounted, and means in connection with the door for engaging either one of the carriers for rotating the selected one with the door.

8. In a condenser mount, a housing with a pivoted door, a pair of carriers mounted on the same axis as the door, and selective means in connection with the door for engaging either one of the carriers and moving it with the door upon their common axis.

9. In a condenser mount, the combination with a shaft fixed against rotation but longitudinally movable, of a pair of lens carriers one of which is fixed against movement longitudinally of the shaft and the other connected to the shaft for movement with it, and means to limit the movement of the movable carrier.

10. In a condenser mount, the combination with a casing having a pivoted door, of a pair of lens carriers one of which is movable with respect to the other, and a shaft to which the movable carrier is connected and upon which the door is pivoted the door having a bracket for engaging the movable carrier for limiting its movement with the said shaft relatively to the other carrier.

11. In a condenser mount, the combination with a housing having a rotatable door, a pair of lens carriers pivotally mounted in the housing and having an axis common to that of the door, and means in connection with the door comprising a self-centering knob with a projecting arm for engaging either one of the carriers to rotate the selected one with the door and out of the housing.

12. In a condenser mount, a perforated plate, a collar slidable in said perforation, a movable lens carrier adjacent said collar, and a moving device to which the collar and said carrier are connected for moving them together and maintaining a constant relation with respect to the carrier and said collar.

13. A condenser mount comprising a housing opened at the front and the rear, a pair of lens carriers one fixed adjacent the front opening of the housing and the other movable with respect to the rear of the housing, and a collar slidable in the rear opening with the movable carrier.

14. In a condenser mount, a housing having a pivoted door, a pair of lens carriers disposed in the housing and having an axis common to that of the door, one of the carriers being movable with respect to the other, and a common means for fixing the position of the other carrier and limiting the rotative movement of the door.

15. A condenser mount comprising a housing with a rotatable portion, a pair of carriers pivotally mounted in the housing each carrier comprising a segmental grooved portion, and means in connection with the rotatable portion of the housing for engaging the extremity of the said grooved portion of either of the carriers to rotate them about their pivotal mounting.

16. In a condenser mount, a housing comprising a perforated back plate, a segmental side and a pivoted door forming with the segmental side a circular opening opposite the perforation in the plate; lens carriers for the front and rear openings, a spring centered knob having an arm rotatable with it for engaging either one of said carriers, and means for holding the door in closed position.

17. In a condensing lens mount, a carrier movable along the lens axis and rotatable transversely thereof about an eccentric axis, and a device upon the eccentric axis for adjustably moving the carrier along the lens axis.

18. In a condensing lens mount, a carrier movable along the axis of the lens and rotatable upon an axis at the side of the carrier near the periphery of the lens, and a mechanical device upon the axis at the side of the carrier for moving the carrier along the lens axis.

19. In a condensing lens mount, a carrier fixed against movement longitudinally of the axis of the lens, another carrier movable longitudinally of the axis of the lens, mechanical means for adjustably moving the carrier along the lens axis, and means for mounting both of the carriers to rotate about an axis at the side of the carriers near the periphery of the lenses.

In testimony whereof I have signed my name to this specification, on this 24th day of Dec., A. D. 1917.

ALVAH C. ROEBUCK.